S. W. THOMAS.
Insect Destroyers.

No. 139,277. Patented May 27, 1873.

Witnesses.

Inventor:
S. W. Thomas
Per Burridge & Co
Attys.

UNITED STATES PATENT OFFICE.

SHERMAN W. THOMAS, OF NORTH ROYALTON, OHIO.

IMPROVEMENT IN INSECT-DESTROYERS.

Specification forming part of Letters Patent No. 139,277, dated May 27, 1873; application filed February 21, 1873.

*To all whom it may concern:*

Figure 1:
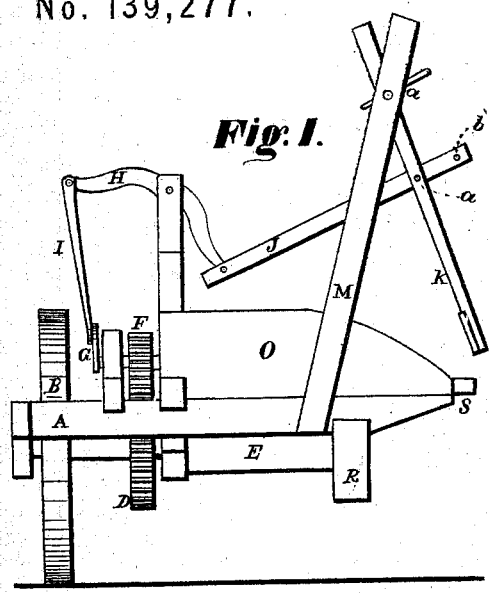
Figure 2:
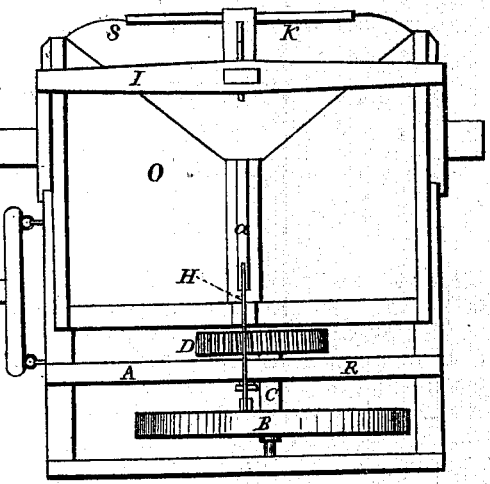
Figure 3:
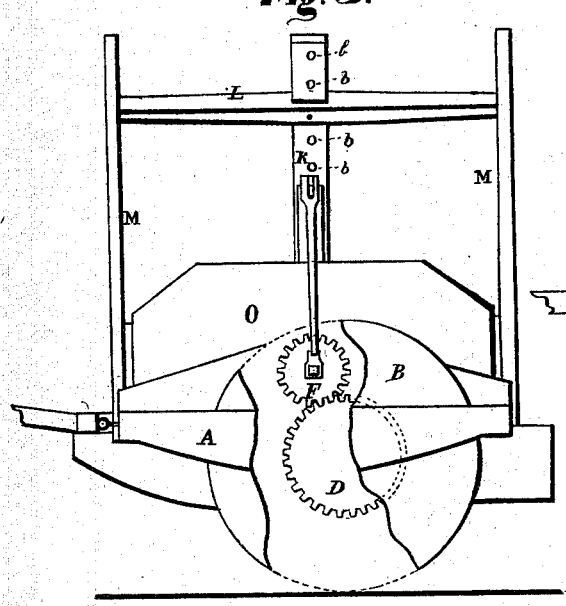
Figure 4:
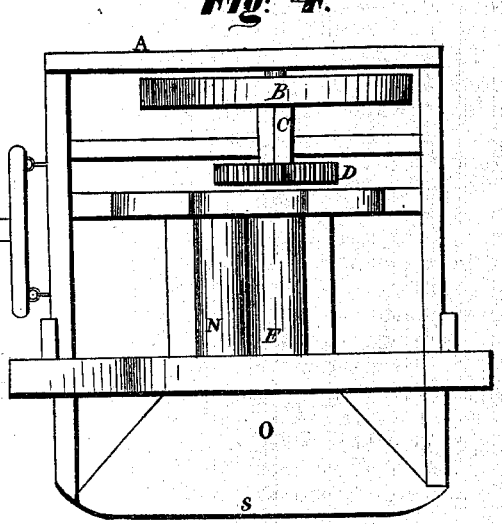

Be it known that I, SHERMAN W. THOMAS, of North Royalton, in the county of Cuyahoga and State of Ohio, have invented certain new and useful Improvements in a Machine for Destroying the Potato-Bug, &c., of which the following is a description:

Figure 1 is an end view of the machine. Fig. 2 is a plan view. Fig. 3 is a side elevation. Fig. 4 is a view of the under side.

Like letters of reference refer to like parts in the several views.

The object of this machine is for killing potato-bugs, popularly known as the Colorado potato-bug; and which machine consists of a pair of rollers running upon each other, and between which the bugs are shaken from the vines and crushed.

The construction and operation of this machine are as follows: A is a frame, in one side of which is a wheel, B, secured to the shaft C, Fig. 4, having its bearings in the frame; also, to the shaft is secured a cog-wheel, D, and a roller, E. Said cog-wheel is made to engage a pinion, F, Fig. 3, provided with a crank, G, Fig. 1. To said crank is attached one end of a lever, H, Fig. 1, by means of a pitman, I. To the opposite end of the lever is attached one end of a link, J. To the opposite end of said link is connected a beater, K. Suspended from the rock-shaft L, having its bearings in the standards M parallel with the roller E, is arranged a companion roller, N. The faces of the two rollers run upon each other, as shown in Fig. 4. In the frame, and immediately above the rollers, is arranged the hopper O, in the bottom of which is a long narrow opening, a, directly over the conjunction of the rollers.

The operation of the machine is as follows: It is placed between the rows of potatoes in such position as to bring the wheel about midway between them, in which position the runner R will rest upon the sides of the hill or ridge of dirt, thereby bringing the side S of the hopper close to the stalks of the vines and under the tops. Now, as the machine is drawn forward by the team the beater K referred to is caused to vibrate, and which, being on the opposite side of the vine from the edge of the hopper, it beats against them, thereby jarring the bugs from the vines into the hopper, down which they tumble to the rollers, and between which they are crushed to death. By repeating this operation a few times on each row all of the bugs, or most of them, can be destroyed.

The beater can be adjusted to beat vines of different heights by shortening or lengthening out the arm K by shifting the pin a in the holes b.

Claim.

What I claim as my invention, and desire to secure by Letters Patent, is—

The combination of the beater K, lever H, link J, pitman I, gearing D F, rollers N E, drive-wheel B, and shoe R, in the manner as and for the purpose set forth.

SHERMAN W. THOMAS.

Witnesses:
W. H. BURRIDGE,
A. P. CORNELL.